United States Patent

Hashida

[11] Patent Number: 5,495,869
[45] Date of Patent: Mar. 5, 1996

[54] CHANGEOVER VALVE AND FLOW CONTROL VALVE ASSEMBLY HAVING THE SAME

[75] Inventor: Koichi Hashida, Itami, Japan

[73] Assignee: Sumitomo Electric Industries, Inc., Osaka, Japan

[21] Appl. No.: 249,741

[22] Filed: May 26, 1994

[30] Foreign Application Priority Data

May 27, 1993 [JP] Japan .................................. 5-125886

[51] Int. Cl.⁶ .................................................. G05D 7/01
[52] U.S. Cl. .......................................... 137/504; 137/501
[58] Field of Search ...................................... 137/501, 504; 251/210

[56] References Cited

U.S. PATENT DOCUMENTS

| | | | |
|---|---|---|---|
| 2,633,147 | 3/1953 | Badami . | |
| 2,912,001 | 11/1959 | Green | 251/210 X |
| 2,994,343 | 8/1961 | Banks | 251/210 X |
| 3,770,008 | 11/1973 | Turney | 251/210 X |
| 5,109,886 | 5/1992 | Takata | 137/625.65 X |
| 5,201,490 | 4/1993 | Maraud | 251/210 X |

FOREIGN PATENT DOCUMENTS

| | | | |
|---|---|---|---|
| 434092 | 6/1991 | European Pat. Off. | 137/501 |
| 0441344 | 8/1991 | European Pat. Off. . | |
| 4226495 | 2/1994 | Germany . | |

*Primary Examiner*—Robert G. Nilson
*Attorney, Agent, or Firm*—Wenderoth, Lind & Ponack

[57] ABSTRACT

A flow control valve assembly has a high degree of liquid-tightness and good flow controllability, even if a high-pressure, low-viscosity fluid is used. A housing of the valve assembly is formed with an inlet port and an outlet port, and a spool inserted in the housing. First and second fluid chambers for applying fluid pressures on both ends of the spool communicate with each other through a fluid passage having an orifice. The opening of the valve portion is adjusted by the movement of the spool so that the spool driving force produced by the difference in the pressures applied to both ends of the spool balances with a biasing force, whereby a fluid flows through the orifice at a controlled rate. This control valve assembly has an elastic annular seal. When the spool moves toward the annular seal, the land portion on the spool outer periphery is adapted to butt the seal, thereby closing the fluid passage. In this closed state, fluid leakage is reduced substantially to zero. Also, it is possible to control the fluid flow even while the flow rate is very low.

6 Claims, 5 Drawing Sheets

1

CHANGEOVER VALVE AND FLOW CONTROL VALVE ASSEMBLY HAVING THE SAME

BACKGROUND OF THE INVENTION

This invention relates to a changeover valve adapted for use in a hydraulic system, such as an automotive brake system, which is required to delicately control the flow of high-pressure, low-viscosity hydraulic fluid within a wide range of flow rates, and a flow control valve assembly including the changeover valve.

FIG. 4 shows a conventional flow control valve assembly having a housing 1 formed with an inlet port 2 and an outlet port 3, and a spool 4 substantially liquid-tightly and slidably mounted in the housing 1. A first fluid chamber 5 and a second fluid chamber 6, which exert fluid pressure on both ends of the spool 4, communicate with each other through a fluid passage 8 having an orifice 7. A valve portion 9 is formed by a land portion formed on the inner surface of the housing 1 and a land portion formed on the outer surface of the spool which are brought into opposed position relative to each other. The fluid passage in the valve is opened and closed by the valve portion 9. The spool is biased by a biasing means 10. Thus, the controlled flow rate in the valve depends upon the biasing force of the biasing means 10.

In this control valve assembly, the spool 4 is biased by the biasing means 10 in a direction opposite to the direction of force applied to the spool by the pressure difference between the first and second fluid chambers 5 and 6. The spool 4 tends to move toward a point at which the pressures on both ends thereof balance with each other. Thus, the degree of opening of the valve portion 9 is automatically adjusted so that the above-mentioned pressure difference balances with the force of the biasing means 10. As a result, hydraulic fluid flows through the second fluid chamber 6 to the outlet port 3 at a rate determined by the pressure difference and the sectional area of the orifice 7.

If more accurate fluid flow control is desired, as shown in FIG. 5, the valve portion 9 may be formed by an elastic annular seal 11 provided around the outer periphery of the spool and a shoulder formed on the outer periphery of the spool and adapted to be brought into contact with the seal 11. This arrangement is disclosed in Unexamined Japanese Patent Publication 3-223578 filed by the applicant of the present invention.

One problem with the flow control valve assembly of FIG. 4 is that a certain degree of fluid leakage is inevitable, because some degree of gap is inevitably, formed between the land portion on the housing inner surface and the land portion on the spool outer surface. Such leakage results in errors in flow rate. Thus, this type of valve is not suitable for use in a hydraulic system used to control the flow rate of a low-viscosity, high-pressure hydraulic fluid with high accuracy.

The flow control valve assembly shown in FIG. 5 is free of fluid leakage because the spool shoulder is brought into tight contact with the elastic annular seal 11. But if a clearance 12 between the outer periphery of the spool 4 and the inner periphery of the housing 1, which is a part of the hydraulic fluid passage, is too wide, the seal 11 may get caught in the clearance and damaged. Thus, the clearance 12 has to be narrow. But, with a narrow clearance 12, the valve cannot pass a large flow rate. Such a control valve assembly has limited use.

SUMMARY OF THE INVENTION

An object of the present invention is to provide a flow control valve assembly which solves the above problems.

According to the present invention, there is provided a changeover valve including a housing having an inlet port and an outlet port and formed with a land portion on the inner peripheral surface thereof. A spool is slidably and substantially liquid-tightly mounted in the housing and formed with a land portion on the outer peripheral surface thereof, the land portions formed on the housing inner periphery and the spool outer periphery being adapted to be brought into opposed position to each other to close and open a fluid passage extending from the inlet port to the outlet port. The housing has, in an inner surface thereof, an annular groove in which is liquid-tightly mounted an annular seal made of an elastic material. The land formed on the spool outer periphery is adapted to come into contact along the edge thereof with the annular seal, thereby closing the fluid passage, when the spool moves toward the annular seal until the land portion on the spool outer periphery abuts the annular seal.

The flow control valve assembly according to the present invention includes a housing having an inlet port and an outlet port and formed with a land portion on inner peripheral surface thereof, and a spool slidably and substantially liquid-tightly mounted in the housing and formed with a land portion on outer peripheral surface thereof. The land portions formed on the housing inner periphery and the spool outer periphery are adapted to be brought into opposed position to each other to close and open a fluid passage extending from the inlet port to the outlet port through an orifice.

The spool has, in an outer peripheral surface, an annular groove in which is liquid-tightly mounted an annular seal made of an elastic material, the annular seal being adapted to come into contact with the edge of the land formed on the housing inner periphery, thereby closing the fluid passage, when the spool moves until the length of sliding contact between the land portion on the spool outer periphery and the land portion on the housing inner periphery becomes maximum.

If the elastic annular seal is adapted to be brought into contact with the edge of the land formed on the outer periphery of the spool, it is liquid-tightly inserted in an annular groove formed in the inner periphery of the housing. If it is adapted to be brought into contact with the edge of the land formed on the housing inner periphery, it is liquid-tightly inserted in an annular groove formed in the outer periphery of the spool.

An inevitable gap is formed in the valve portion comprising the land portion on the housing inner periphery and the land portion on the spool outer periphery which are adapted to be brought into sliding contact with each other. But since the edge of the land portion formed on the spool or the housing is brought into tight contact with the annular seal, it is possible to close the fluid passage with the annular seal and thus to completely close the valve without any fluid leakage.

A fluid passage having a sufficient sectional area is formed inside the seal if the annular seal is inserted in the annular groove formed in the inner periphery of the housing, and around the seal if the annular seal is inserted in the annular groove formed in the outer periphery of the spool. In either case, no clearance similar to the clearance 12 shown in FIG. 5 is formed. This arrangement permits a large fluid flow to pass while preventing the seal from getting caught in such a clearance.

While the spool biasing force is extremely small, the flow rate is controlled in a very narrow range according to the varying degree of opening between the seal and the spool. While the biasing force is moderately small, the flow rate is controlled with the varying length of sliding contact between the land portion on the spool outer periphery and the land portion on the housing inner periphery (or gap width in the valve portion). When the biasing force is rather large, the flow rate is controlled as the degree of opening of the main fluid passage varies. Thus, the flow rate can be controlled within a wide range.

Thus, according to the present invention, while the valve is closed, it maintains good liquid-tightness. While the flow rate is low, it can be controlled reliably. When the travel distance of the spool increases, the fluid chamber in which one end of the spool is disposed will come into direct communication with the port. Thus, it is possible to sufficiently increase the fluid flow rate. Further, since the gap at the valve portion is extremely narrow, the annular seal will never be damaged. Such a flow control valve assembly is of high performance and reliable.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
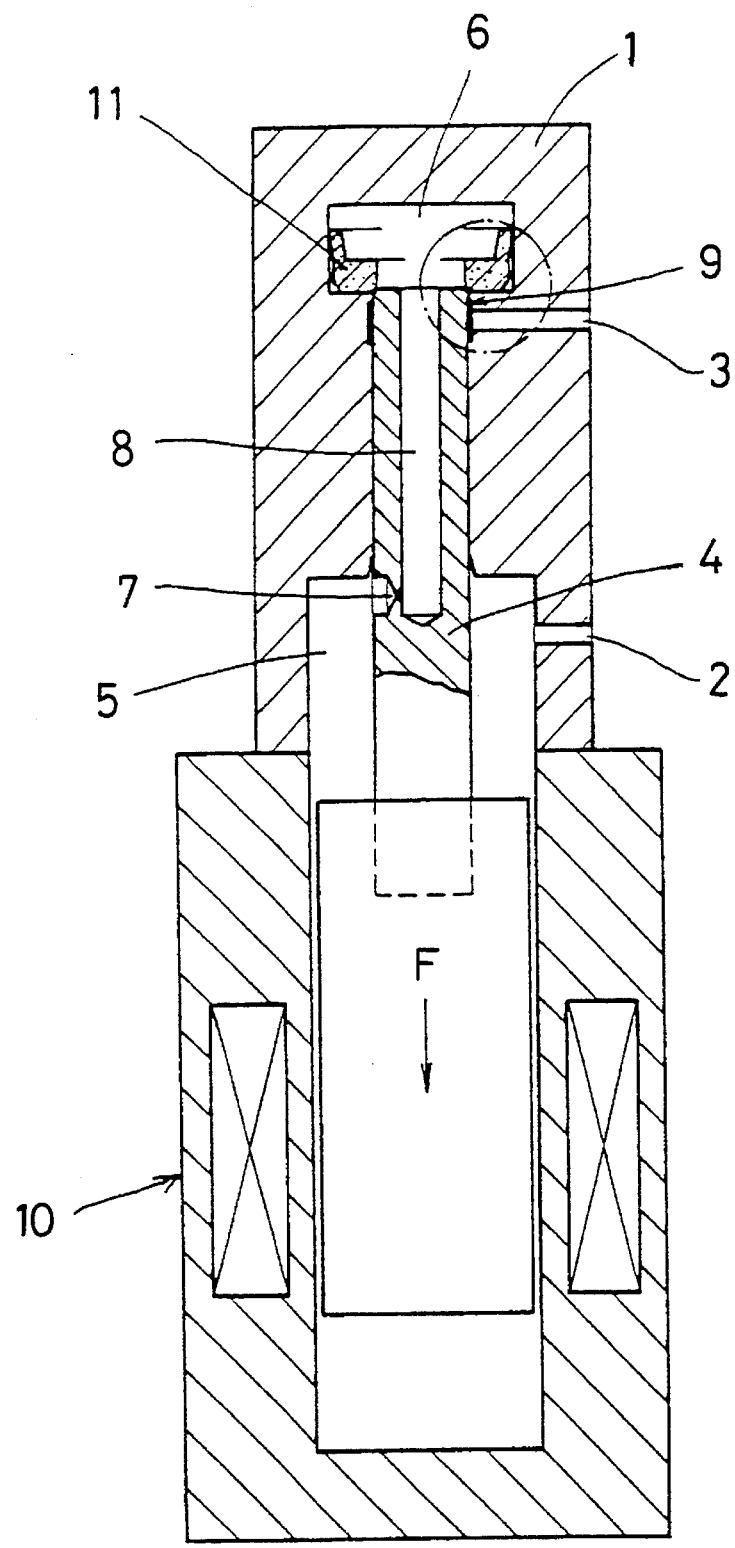
FIG. 1 is a sectional view of an embodiment of the flow control valve assembly according to the present invention.

FIG. 1 shows an embodiment of the flow control valve assembly including the changeover valve according to the present invention.

The flow control valve assembly has a housing 1 formed with an inlet port 2 and an outlet port 3, and a spool 4. Numerals 5 and 6 designate a first fluid chamber leading to the inlet port and a second fluid chamber for discharging fluid toward the outlet port 3, respectively. The first and second fluid chambers communicate with each other through a fluid passage 8 having an orifice 7.

In the embodiment, the fluid passage 8 is formed in the spool 4, but such a passage having an orifice may be formed in the housing 1. A valve portion 9 is formed by a land portion formed on the inner surface of the housing 1 and a land portion formed on the outer surface of the spool 4, which are brought into opposed position relative to each other. The fluid passage in the valve is opened and closed by the valve portion 9. Fluid from the second fluid chamber 6 flows through the valve portion 9 to the outlet port 3.

The spool 4 is biased downwards in the figure by a biasing means 10. In the embodiment, the biasing means is an electromagnet whose biasing force is variable by electronically controlling the current applied thereto.

An annular seal 11 of an elastic material is provided in the second fluid chamber 6. The spool 4 is adapted to come into contact along its edge with the seal 11.

While the biasing force F of the biasing means 10 is zero, the spool 4 is pushed to the extreme end of its movement toward the second fluid chamber 6 and kept in contact with the annular seal 11. In this state, the fluid flow between the inlet port 2 and the outlet port 3 is substantially zero except for slight leakage through a gap formed around the outer periphery of the spool.

When the electromagnet is energized, the spool 4 is moved by its biasing force F, so that the degree of opening of the fluid passage extending from the second fluid chamber 6 to the outlet port 3 will be adjusted automatically. While the biasing force F is extremely small, such an adjustment of the opening is made between the annular seal 11 and the spool 4. While the force F is moderately small, the opening is adjusted with variation in the length L1 (FIG. 2(b)) of contact between the land portion on the spool outer periphery and the land portion on the housing inner periphery. When the force F is rather large, such an adjustment is made by the amount of opening L2 (FIG. 2(c)) of the outlet port 3. The degree of opening of the fluid passage is thus automatically adjusted to such a value that the fluid pressure difference between the first and second fluid pressure chambers 5 and 6 balances with the biasing force F. Therefore, the controlled fluid flow rate, which is determined by the pressure difference and the sectional area of the orifice 7, is proportional to the biasing force F.

Figure 2A:
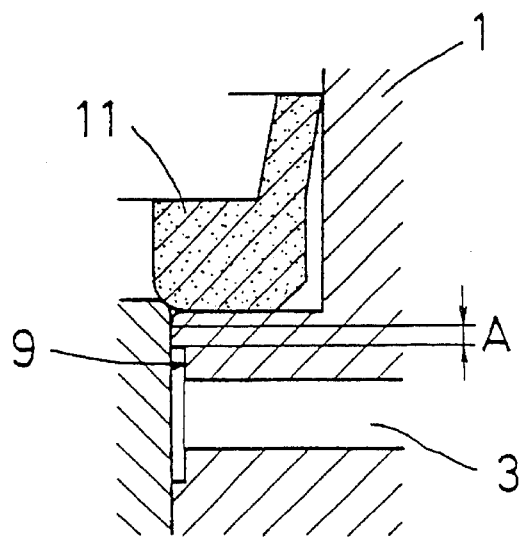
FIG. 2(a) is an enlarged view of the portion enclosed in chain line of FIG. 1 showing the state in which the biasing force is zero.
Figure 2B:
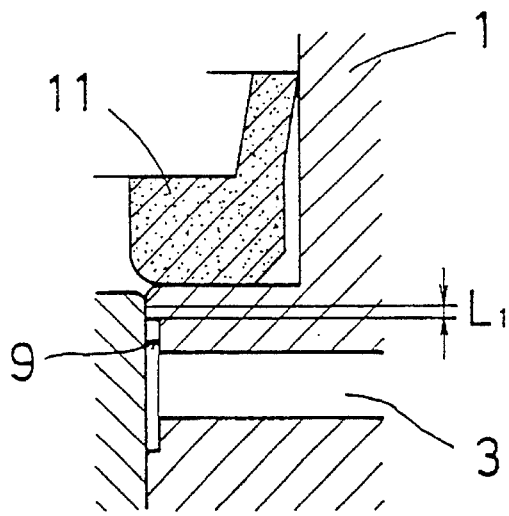
FIG. 2(b) is a similar view to FIG. 2 (a) showing the state in which the biasing force is small.
Figure 2C:
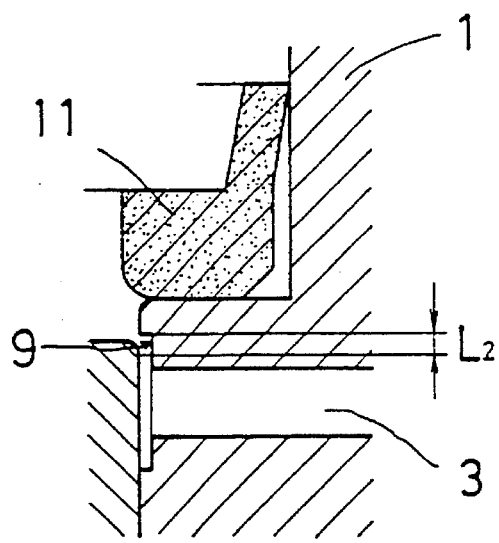
FIG. 2(c) is a similar view FIGS. 2(a)–2(b) showing the state in which the biasing force is large.
Figure 4:
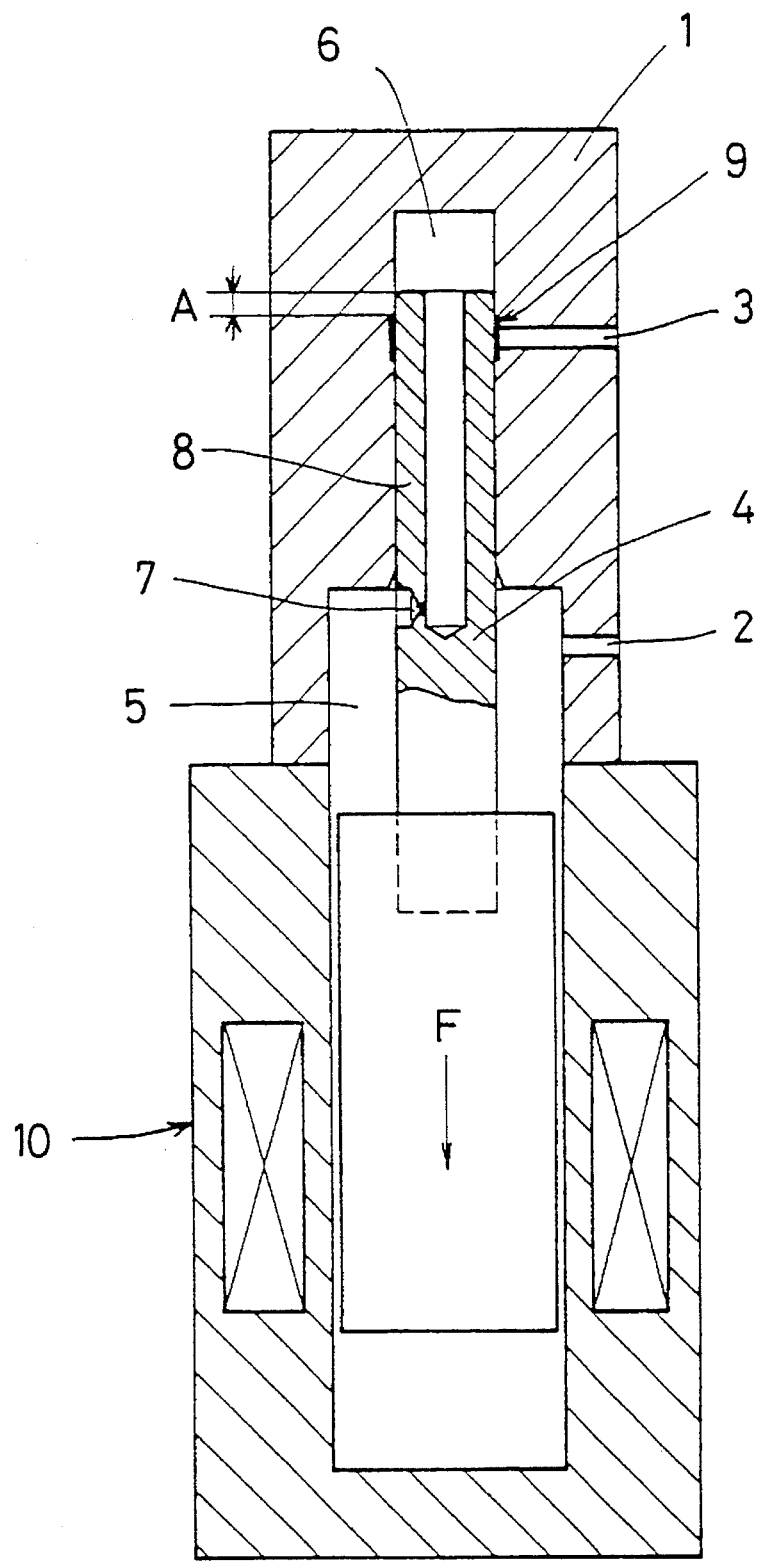
FIG. 4 is a view showing a conventional flow control valve assembly.
Figure 5:
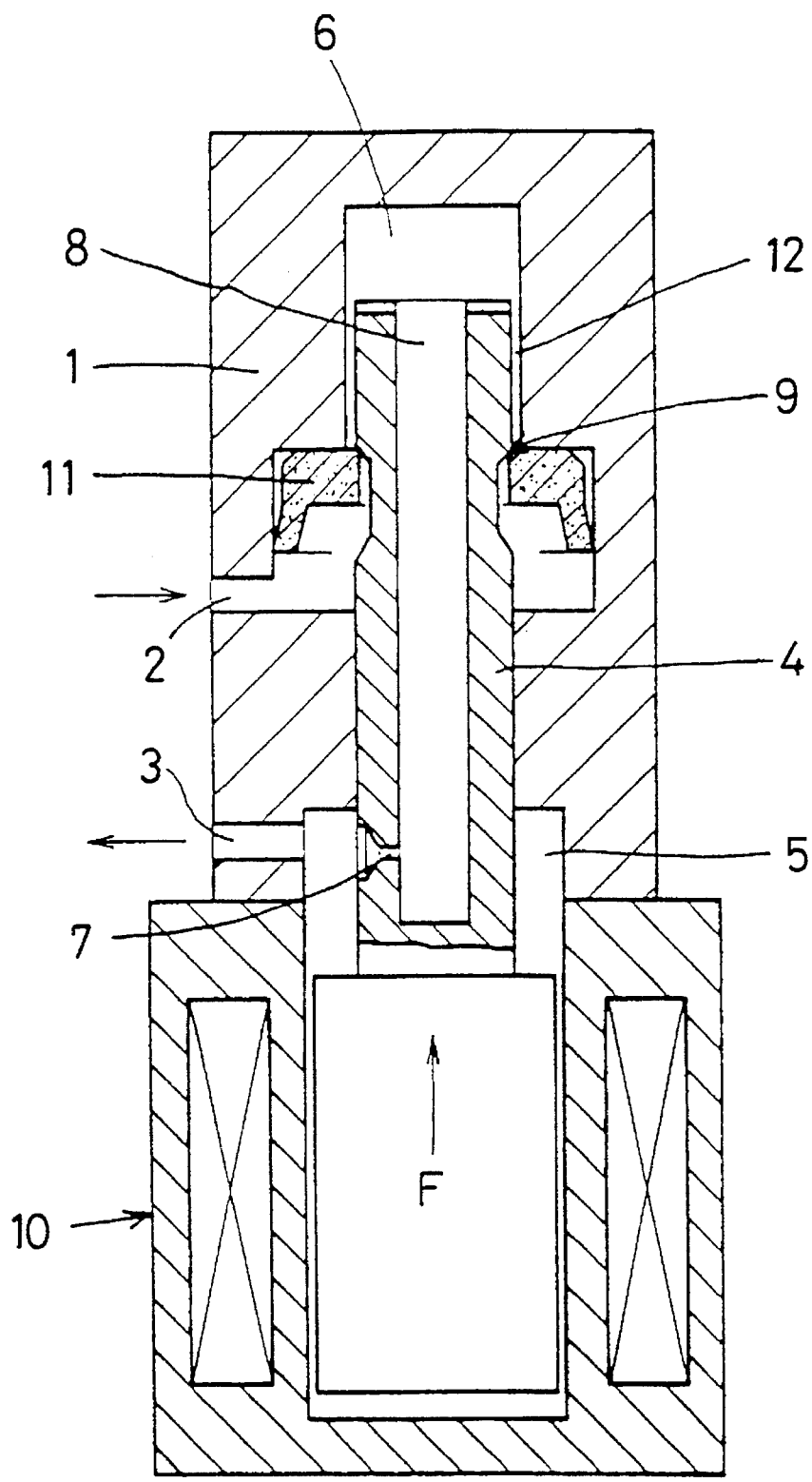
FIG. 5 is a view showing another conventional flow control valve assembly.

The length A (in FIG. 2(a)) of contact at the valve portion 9 can be made substantially shorter than the corresponding contact length in the control valve of FIG. 4. This is because, in the arrangement of FIG. 4, a rather long contact length A is needed to prevent fluid leakage, whereas in the arrangement of the present invention, the annular seal 11 serves to prevent fluid leakage and thus the length A need not be so long.

Because the contact length at the valve portion may be minimum, there is no possibility of the seal 11 getting caught in the valve portion.

If the valve is a constant-flow control valve, the orifice 7 may have a constant sectional area, as shown in FIG. 1. Also, the biasing means 10 may be of a type whose biasing force is constant, such as a spring.

Figure 3:
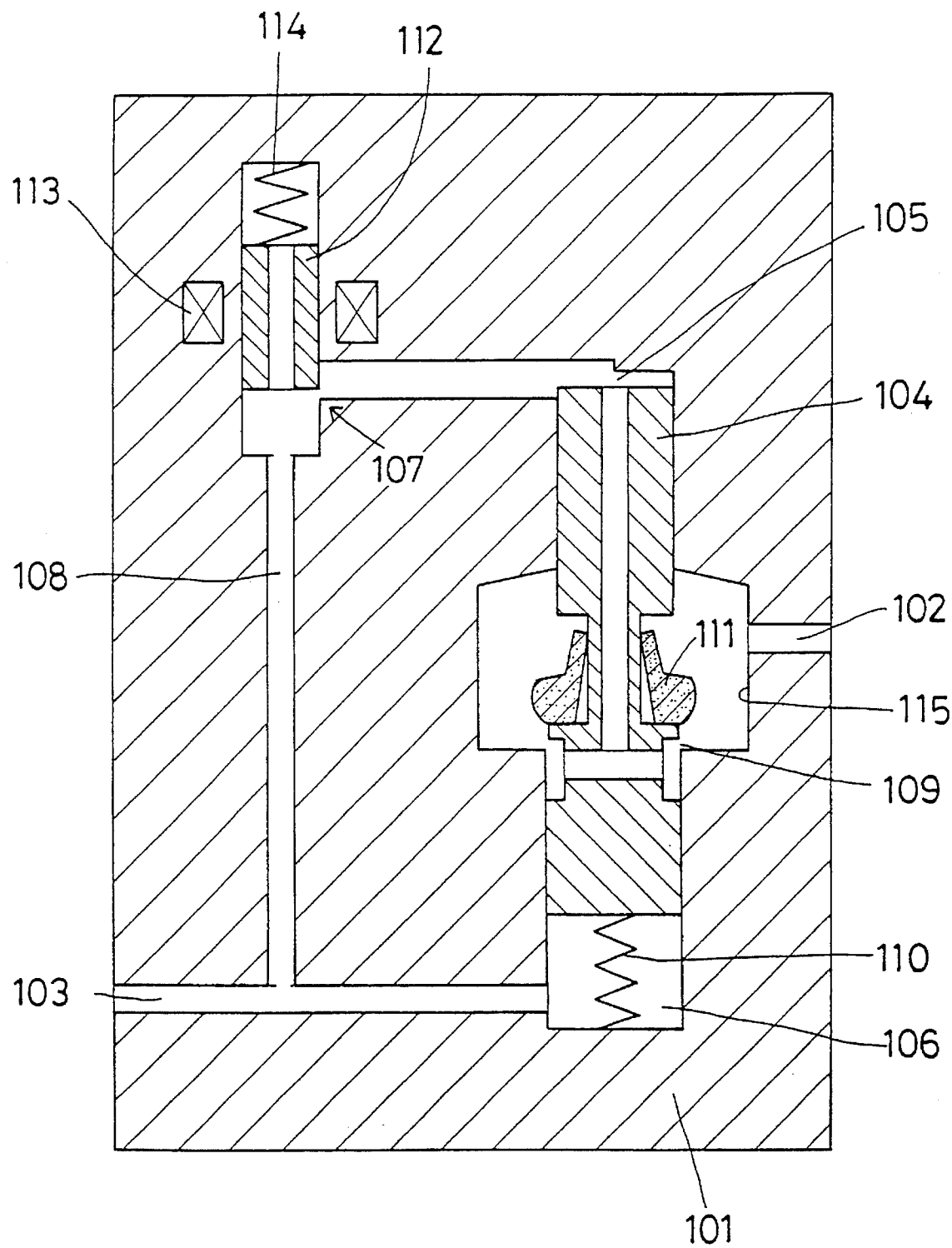
FIG. 3 is a sectional view of another embodiment.

FIG. 3 shows another embodiment of the present invention.

The valve assembly of this embodiment has a housing 101 formed with an inlet port 102 and an outlet port 103, a spool 104, a first fluid chamber 105, and a second fluid chamber 106 leading to an outlet port 103. The first and second fluid chambers 105, 106 communicate with each other through a fluid passage 108 having an orifice 107.

The orifice 107 is defined by the housing 101 and a valve body 112, and its sectional area is variable. Its sectional area changes as the valve body 112 moves to a position where the electromagnetic force produced by a current that flows through a coil 113 balances with the force of a spring 114. Numeral 109 indicates a valve portion comprising a land portion on the housing inner periphery and a land portion on the spool outer periphery which are brought into sliding contact with each other. The fluid passage between the inlet port 102 and the first fluid chamber 105 is opened and closed by the valve portion 109.

The spool 104 is biased upwards by a biasing means 110, which is, in this embodiment, a spring having a constant force.

An elastic annular seal 111 is fixed to the spool 104 in a third fluid chamber 115 having a diameter larger than the diameter of the seal. The seal 111 is adapted to be brought into contact with the edge of the land portion on the inner periphery of the housing 101.

In this embodiment, the annular seal 111 is fixed to the spool 104 and the spring 110 has a constant biasing force. The flow rate is controlled through the variable orifice. But since its function and effects are the same as with the first embodiment, their detailed description is omitted.

The mounting position of the annular seal, whether or not the biasing force is variable, and whether or not the sectional area of the orifice is variable, may be determined freely taking into consideration the property of the fluid used and the required range of flow rates. If both the biasing force and the orifice sectional area are variable, one of them may be changeable between two steps while the other is variable in a plurality of steps or steplessly.

The changeover valve according to the present invention is applicable not only to a flow control valve assembly but also to a flow direction changeover valve or a pressure control valve. It is particularly suitable where both high fluid-tightness (while closed) and high flow rate (while opened) are required. The flow control valve assembly according to the present invention is also not limited to the specific types of the embodiments but may be of the type proposed by the applicant of the present invention in Unexamined Japanese Patent Publication 3-234987.

What is claimed is:

1. A flow control valve assembly, comprising:

a housing having an inlet port, an outlet port, an inner peripheral surface, and a land portion on said inner peripheral surface;

a spool that is slidably and substantially liquid-tightly mounted in said housing, said spool having an outer peripheral surface portion opposable to said land portion of said housing;

a first fluid chamber provided at one end of said spool in said housing and a second fluid chamber provided at the other end of said spool in said housing for exerting fluid pressure on said spool;

a fluid passage communicating said first fluid chamber with said second fluid chamber and extending between said inlet port and said outlet port, said fluid passage having an orifice therein;

an annular seal made of an elastic material disposed on said inner peripheral surface of said housing; and a biasing means for biasing said spool;

wherein a valve portion is formed by said land portion of said inner peripheral surface of said housing and said outer peripheral surface portion of said spool in said fluid passage for opening and closing said fluid passage between said inlet port and said outlet port, the degree of opening of said valve portion being automatically adjusted by movement of said spool such that a spool driving force produced by a fluid pressure difference between said first and second fluid chambers balances with a biasing force of said biasing means, counteracting the spool driving force, whereby fluid flows through said orifice to said outlet port at a rate determined by said fluid pressure difference and the sectional area of said orifice; and wherein said spool is movable between a first position in said housing in which said outer peripheral surface portion abuts said annular seal and said land portion of said housing, whereby said fluid passage is closed, a second position in said housing in which said outer peripheral surface portion does not abut either said annular seal or said land portion, whereby said fluid passage is open, and a third position in which said outer peripheral surface portion of said spool contacts said land portion of said housing but does not abut said annular seal.

2. The changeover valve of claim 1, wherein said third position of said spool is located between said first and second positions.

3. A changeover valve arrangement comprising:

a housing having an inlet port, an outlet port, an inner peripheral surface and a land portion on said inner peripheral surface;

a fluid path extending between said inlet port and said outlet port;

a spool disposed in said housing that is slidably and substantially liquid-tightly mounted in said housing, said spool having an outer peripheral surface with an outer peripheral surface portion opposable to said land portion of said housing;

a valve portion located in said fluid path for opening and closing said fluid path between said inlet port and said outlet port, said valve portion being defined by said land portion of said inner peripheral surface of said housing and said outer peripheral surface portion of said spool;

an annular seal made of an elastic material disposed on one of said inner peripheral surface of said housing and said outer peripheral surface of said spool;

wherein said spool is movable between a first position in said housing in which one of said outer peripheral surface portion of said spool and said land portion of said housing abuts both said annular seal and the other of said outer peripheral surface of said spool and said land portion of said housing, whereby said fluid path is closed, a second position in said housing in which the one of said outer peripheral surface portion of said spool and said land portion of said housing does not abut either said annular seal or the other of said outer peripheral surface of said spool and said land portion of said housing, whereby said fluid path is open, and a third position in which said outer peripheral surface portion of said spool contacts said land portion of said housing but the one of said outer peripheral surface portion of said spool and said land portion of said housing does not abut said annular seal;

a first fluid chamber provided at one end of said spool in said housing and a second fluid chamber provided at the other end of said spool in said housing for exerting fluid pressure on said spool, said first and second fluid chambers having a fluid passage therebetween with an orifice restriction therein; and a biasing means for biasing said spool in at least one direction of movement in said housing;

wherein the degree of opening of said valve portion is automatically adjusted by movement of said spool such that a spool driving force produced by a fluid pressure difference between said first and second fluid chambers balances with a biasing force of said biasing means, counteracting the spool driving force, whereby fluid flows through said orifice to said outlet port at a rate determined by said fluid pressure difference and the sectional area of said orifice.

4. The changeover valve arrangement of claim 3, wherein said biasing means comprises an electromagnet having an electronically controlled variable biasing force.

5. The changeover valve arrangement of claim 3, wherein said fluid passage between said first and second chambers forms a part of said fluid path between said inlet port and said outlet port.

6. The changeover valve arrangement of claim 5, wherein said fluid passage extends through said spool, with said orifice restriction being located in said spool.

* * * * *